W. E. PORTER.
ELECTRICAL MEASURING INSTRUMENT.
APPLICATION FILED SEPT. 25, 1914.
1,155,095.
Patented Sept. 28, 1915.
2 SHEETS—SHEET 1.
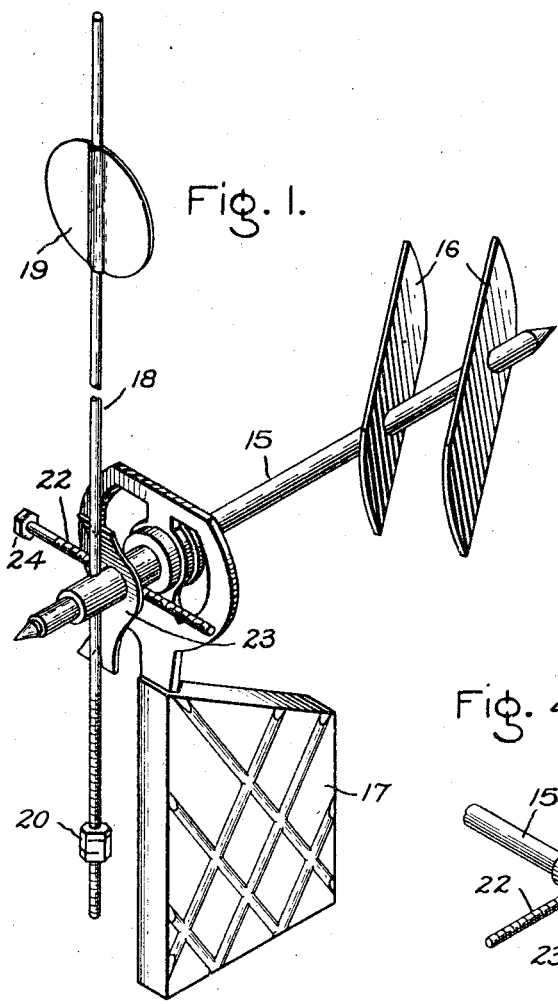
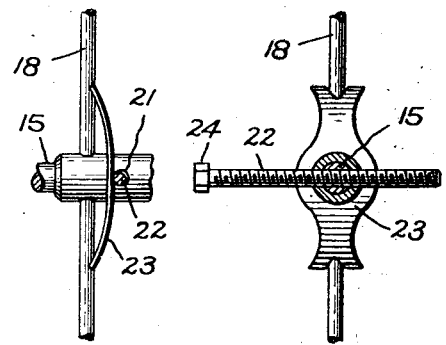
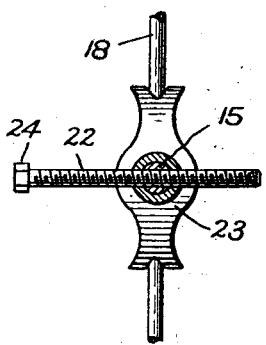
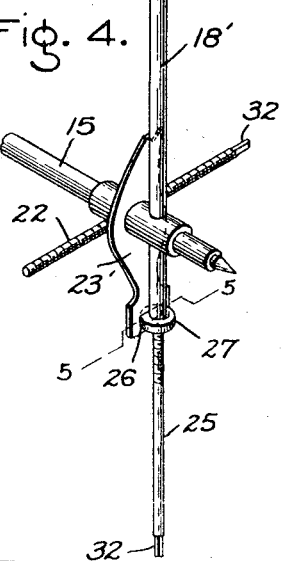
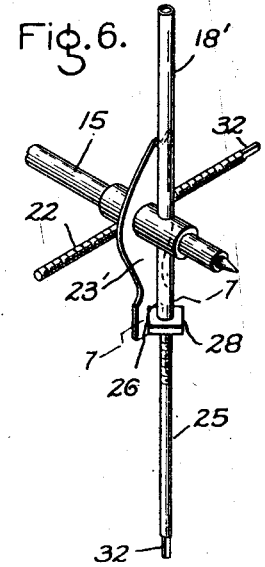
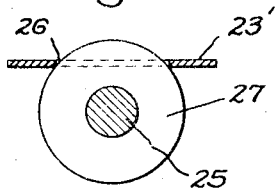
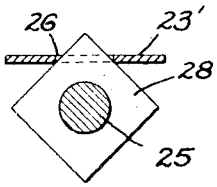
Witnesses:
Earl G Klock
J. Ellis Eben
Inventor,
Willard E. Porter,
by Allen H. Davis
Att'y.

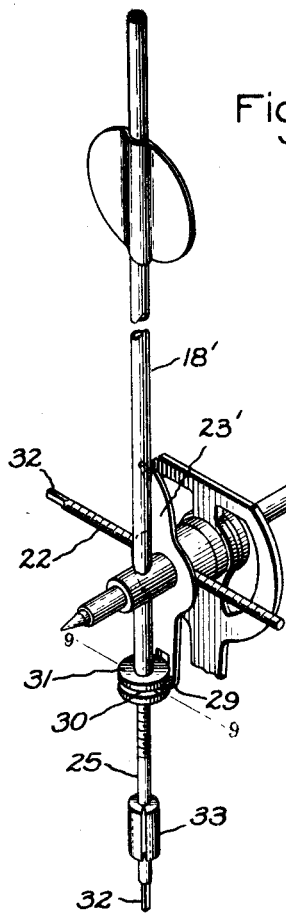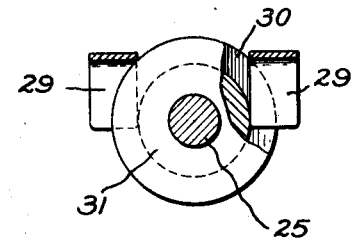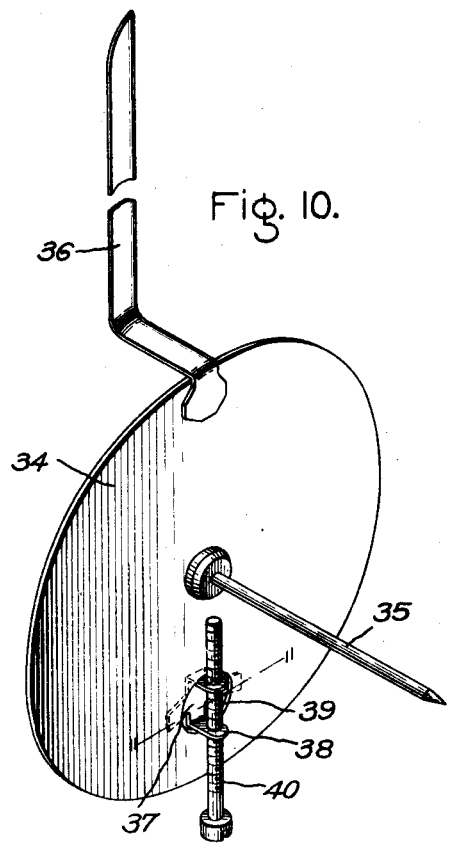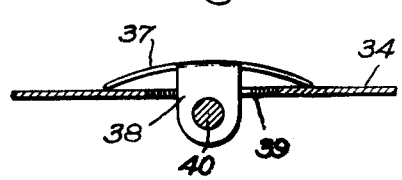

UNITED STATES PATENT OFFICE.

WILLARD E. PORTER, OF LYNN, MASSACHUSETTS, ASSIGNOR TO GENERAL ELECTRIC COMPANY, A CORPORATION OF NEW YORK.

ELECTRICAL MEASURING INSTRUMENT.

1,155,095.  Specification of Letters Patent.  Patented Sept. 28, 1915.

Application filed September 25, 1914. Serial No. 863,475.

*To all whom it may concern:*

Be it known that I, WILLARD E. PORTER, a citizen of the United States, residing at Lynn, county of Essex, State of Massachusetts, have invented certain new and useful Improvements in Electrical Measuring Instruments, of which the following is a specification.

My invention relates to electrical measuring instruments, and particularly to counterbalancing devices for the moving element of electrical measuring instruments.

The object of my invention is to provide a novel and improved construction of counterbalancing device for the moving element of an electrical measuring instrument.

More particularly the object of my invention is to provide a simple, inexpensive and reliable means for securing a counterweight or a cross counterbalancing arm to the moving element of such an instrument, and further such means for securing both a counterweight and a cross counterbalancing arm to the moving element.

The novel features of my invention which I believe to be patentable and upon which I desire to secure Letters Patent are definitely indicated in the claims appended hereto. The principle of my invention and its embodiment in the moving element of an electrical measuring instrument will be understood from the following description taken in connection with the accompanying drawings in which:

Figure 1 is a perspective view of the moving element of an electrical measuring instrument embodying my invention; Figs. 2 and 3 are detail views of the counterbalancing device of the moving element shown in Fig. 1; Figs. 4, 6, 8 and 10 are perspective views of modified forms of the invention; and Figs. 5, 7, 9 and 11 are detail sectional views on the section lines 5—5, 7—7, 9—9 and 11—11 of Figs. 4, 6, 8 and 10, respectively.

The moving element of an electrical measuring instrument should usually have two counterbalance adjustments substantially at right angles to each other in effect. Generally the counterbalance adjustments are effected by two counterbalancing devices, a side or cross balancing arm to counterbalance inequalities in the symmetry of each side of the moving element, and a counterbalancing device or counterweight to counterbalance for the pointer, damping, or other analogous member of the moving element. In accordance with my present invention, the side or cross balancing arm is firmly secured to the moving element in a novel and improved manner by the action of a spring member. I further provide a novel and improved construction whereby the same spring member serves to firmly secure the counterweight to the moving element. Preferably, and as a matter of practice generally, the cross balancing arm and the counterweight are adjustable, and in accordance with the novel and improved construction of my present invention, the adjustment of each of these counterbalancing devices may be conveniently and accurately accomplished.

My invention will be best understood by reference to the accompanying drawings.

Fig. 1 of the drawings shows the moving element of an electrical measuring instrument of the well known inclined coil type. A shaft 15 having pivot pins at each end serves to pivotally mount the moving element in the jewels or other bearings of the instrument in the well understood manner. The shaft carries the usual metallic vanes 16 and an air damping member 17. A pointer member 18 extends transversely through the shaft and is rigidly secured thereto. The pointer member has at one end an indicating vane 19 and at the other end a counterweight 20. The counterweight 20 is in the form of a check or lock nut having two symmetrically positioned slots or saw cuts.

A hole 21 extends transversely through the shaft 15 substantially at right angles to and a short distance from the member 18. A side balancing arm 22 extends through the hole 21. The hole 21 may be screw-threaded and the arm 22 secured therein, or the diameter of the hole 21 may be slightly greater than that of the arm 22 and not screw-threaded, in which case the arm may be freely moved through the hole. A leaf or flat spring member 23 having a hole intermediate its ends through which the shaft 15 extends is loosely positioned between the member 18 and the side balancing arm 22. The extremities of the spring 23 are notched and bear against the member 18, as clearly shown in Fig. 3 of the drawings, while the intermediate or middle portion of the spring exerts a force or pressure against the side balancing arm 22. The action of the spring is to firmly hold the arm in the hole 21 of the shaft. The arm 22 may be conveniently turned or moved for adjustment by means of a nut 24 secured thereto. It will thus be observed that the spring in effect braces itself against the relatively rigid member 18 and exerts its spring action against the arm 22, whereby the arm is firmly secured to the moving element in its desired adjusted position.

In Figs. 4, 6 and 8 of the drawings, I have illustrated my novel and improved means for securing both counterbalancing devices to the moving element by the action of a single spring. In the construction shown in these figures the shaft 15, pointer member 18' and side balancing arm 22 are correlated exactly as in the construction shown in Fig. 1. The pointer member 18' is, however, hollow, or may have only a hollow portion at one end, and a counterweight arm 25 is adapted to extend freely and loosely within the member. A nut is threaded on a screw-threaded portion of the arm 25 and is held in a relatively fixed position with respect to the moving element by the action of a flat leaf spring member, one end of the latter bearing against the nut. In Figs. 4 and 6, I have shown a leaf spring member 23' having a notch at one end and a hole 26 at the other end. In Figs. 4 and 5, I have shown a round nut 27 engaging in the hole 26 of the spring 23', while in Figs. 6 and 7 I have shown a square nut 28 engaging in the hole. It will be observed that where the round nut 27 is employed the hole 26 is rectangular, as indicated in Fig. 4, while this hole may be circular where the square nut 28 is employed, as indicated in Fig. 6. In Fig. 8, the spring 23' is provided at one end with ears 29 which engage in substantially diametrically opposite sections of a peripheral groove 30 in a round nut 31.

It will be observed in each of the three modifications shown in Figs. 4, 6 and 8 that the nut 27, 28 or 31, as the case may be, is firmly held in position by the action of the flat spring. The counterweight arm may thus be threaded through the relatively fixed nut to secure the desired adjustment. In Figs. 4, 6 and 8, I have shown the ends of the counterbalancing arm 22 and the counterweight arm 25 flattened to provide square or other irregular shaped ends 32. A suitable wrench may then be employed to turn the arm for adjusting purposes.

In Fig. 8 of the drawings, I have shown an additional counterweight 33 secured to the counterweight arm 25. The counterweight 33 is conveniently made out of a piece of brass rod, drilled and split lengthwise. The dimensions are such that the counterweight 33 can be readily pushed on one end of the counterweight arm 25, which, it will be observed, is not threaded at its ends. The counterweight 33 opens up slightly when it is pushed on the arm 25, and the spring of the stock holds it firmly in position. The split counterweights 33 are made in various sizes, and one of the proper weight for an approximate balance is placed on the arm 25. The fine adjustment for exact counterbalancing is then obtained by screwing the arm 25 through its coöperating nut.

In Fig. 10, I have shown the counterbalancing device secured to a damping disk 34 of a moving element particularly adapted for an electrical measuring instrument of the type disclosed in the patent application filed on behalf of myself and Alvarado L. R. Ellis, May 16, 1914, Serial Number 836,647. The damping disk is mounted upon a shaft 35 provided with the usual pivot points. A pointer member 36 is secured to one side of the damping disk 34, and the counterbalancing device is adjustably mounted on the diametrically opposite side of the disk. The counterbalancing device comprises a spring clip 37 having two ears or projections 38 extending through a circular hole 39 in the disk. The length of the spring clip is greater than the diameter of the hole 39, and movement of the clip through the hole in one direction is thus prevented. The projections 38 are provided with apertures in which a screw-threaded counterbalancing arm 40 is operatively positioned. The material of the projections is so thin that the threads on the counterbalancing arm 40 are engaged thereby, thus eliminating the necessity of threading the apertures. The arms of the spring clip 37 contact with the disk 34 and exert a spring tension tending to pull the projection 38 back through the hole 39, which at once serves to hold the spring clip and the counterbalancing arm definitely in position, but permits the ready adjustment of each of these members. By turning the spring clip, the entire counterbalancing device may be rotated in the hole 39, and by turning the counterbalancing arm 40, the position of the arm with respect to the spring clip can be altered. These two movements provide the necessary counterbalancing adjustments. It will be seen that the spring clip 37 in effect braces itself against one side of the disk 34 and its spring tendency pulls the counterbalancing arm against the other side of the disk thus firmly securing the arm with respect to the disk and the moving element.

The novel construction of counterbalancing device of my present invention possesses the following particular advantages,—capability of instant adjustment without undue strain on delicate armatures,—small number of parts,—simplicity of parts,—small space required,—lightness,—and adaptability to nearly all types of instruments. The balance of electrical measuring instruments must have a final adjustment after assembly, and with the easy friction lock of my invention less care is necessary in this final adjustment to prevent injury to the delicate parts of the instrument than in any counterbalancing device known to me. Again, in all counterbalancing devices of which I have knowledge considerable exactness is necessary to make counterweight nuts and rods interchangeable. In my construction considerable more margin can be allowed in this direction.

It will be observed from the foregoing description that I have provided an extremely simple construction for simultaneously securing two counterbalancing devices to the moving element of an electrical measuring instrument by the action of a single spring member. The spring member primarily holds the counterbalancing arm in position by a force exerted against the arm whereby the arm is firmly held against a rigid part of the moving element. In effect the spring is braced against one rigid member of the moving element and forces the counterbalancing arm against another rigid member. In the construction shown in Fig. 10 of the drawings one side of the disk 34 serves as a rigid member against which the spring 37 is braced, while the other side of the disk serves as the other rigid member against which the counterbalancing arm is forced by the action of the spring. Secondarily, the spring member holds relatively fixed the nut in which the counterweight arm 25 is threaded. The spring member in this connection forces the counterweight arm against the wall of the hole in the shaft 18' so that the arm is frictionally held firmly in position in its coöperating nut. The spring member may obviously be employed to simultaneously secure both counterbalancing devices to the moving element or may be separately employed to secure either counterbalancing device to the moving element in accordance with the principle of construction of my present invention. It will furthermore be evident to those skilled in the art that the spring member may operatively bear directly on the threaded portion of the counterweight arm 25 as well as through the action of an independent nut, which in effect amounts to making the nut, as an operative element in the combination, integral with the spring.

It will of course be understood that the foregoing description and accompanying illustrations are merely for the purpose of explaining the principle of my invention. Numerous practical embodiments of the invention in the moving element of various types of electrical measuring instruments will be evident to those skilled in the art. I, accordingly, do not wish to be restricted to the particular constructions disclosed herein by way of example for the purpose of setting forth my invention in accordance with the patent statutes. The terms of the appended claims, are, therefore, not restricted to the precise structures disclosed but are intended to cover all changes and modifications within the spirit and scope of my invention.

What I claim as new and desire to secure by Letters Patent of the United States, is:—

1. In an electrical measuring instrument, the combination with a movable element of a counterbalancing arm and a counterweight arm, and a spring operatively related to said element and adapted to firmly maintain said counterbalancing arm and said counterweight arm in their respective positions.

2. In an electrical measuring instrument, the combination with a movable element of a counterbalancing arm and a counterweight arm positioned substantially at right angles to each other, and a single flat spring operatively related to said element and adapted to firmly maintain each of said arms in its proper adjusted position.

3. In an electrical measuring instrument, the combination with a movable element of a counterbalancing arm and a counterweight arm positioned substantially at right angles to each other, a nut threaded on said counterweight arm, and a spring operatively related to said element and acting on said counterbalancing arm and on said nut whereby each of said arms is firmly maintained in its proper position.

4. In an electrical measuring instrument, the combination with a movable element of two counterbalancing arms positioned substantially at right angles to each other, and a spring carried by said element and adapted to secure each of said arms in its proper position with respect to the element.

5. In an electrical measuring instrument, the combination with a movable member having a longitudinal hole in one end thereof, of a counterweight arm adapted to extend into said hole, a nut threaded on said arm, and resilient means for maintaining the nut in a fixed position with respect to said member.

6. In an electrical measuring instrument, the combination with a movable element of a counterweight arm, a nut threaded on said arm, and a spring operatively secured to said element and adapted to maintain the nut in a fixed position with respect to said element.

7. In an electrical measuring instrument, the combination with a movable member of a counterbalancing arm, and a flat spring having its ends bearing against said member and exerting a force on said arm to hold said arm in an adjusted position with respect to said member.

8. In an electrical measuring instrument, the combination with a movable shaft having a transverse hole therein of a counterbalancing arm positioned in said hole, a member secured to said shaft in a position substantially at right angles to said arm, and a spring resting against said member and exerting a force on said arm to securely hold the arm in its adjusted position in the hole in said shaft.

9. In an electrical measuring instrument, the combination with a movable element of a counterbalancing arm, and a spring braced against a rigid member of said element and adapted to exert a force on said arm to firmly hold the arm against a rigid part of said element.

10. In an electrical measuring instrument the combination with a moving element of a counterbalancing arm, and a flat spring braced against a rigid member of said element and adapted to exert a force on said arm to firmly hold the arm against a second rigid member of said element.

11. In an electrical measuring instrument, the combination with a movable shaft having a transverse hole therein of a counterbalancing arm positioned in said hole, a member secured to said shaft in a position substantially at right angles to said arm, and a spring braced against said member and exerting a force against said arm whereby the arm is forced firmly against the wall of the hole in said shaft.

12. In an electrical measuring instrument, the combination with a movable shaft having a transverse hole therein of a counterbalancing arm positioned in said hole, a pointer member secured to said shaft substantially at right angles to said arm, and a flat spring having a hole through which said shaft freely extends and having its ends resting against said member whereby the spring exerts a force on said arm to hold the arm firmly in the hole in said shaft.

13. In an electrical measuring instrument, the combination with a movable shaft having a transverse hole therein of a counterbalancing arm extending through said hole, a member secured to said shaft substantially at right angles to and a short distance from said arm, and a flat spring positioned between said arm and said member and having its ends resting against said member and an intermediate portion acting against said arm to firmly hold the arm in the hole in said shaft.

14. In an electrical measuring instrument the combination with a movable shaft having a transverse hole therein of a counterbalancing arm extending through said hole, a member secured to said shaft substantially at right angles to and a short distance from said arm, said member having a longitudinal hole in one end, a counterweight arm extending into the hole in said member, a nut threaded on said counterweight arm, and a flat spring having one end resting against said member and the other end resting against said nut and an intermediate portion acting against said counterbalancing arm, whereby the nut is maintained in a relatively fixed position and the counterbalancing arm is firmly held in the hole in said shaft.

15. In an electrical measuring instrument, the combination with a movable element of a counterweight arm, and a spring having one end bearing against a rigid member of said element and the other end operatively bearing against said counterweight arm.

16. In an electrical measuring instrument, the combination with a movable member having a longitudinal hole in one end thereof, of a counterweight arm adapted to extend into said hole, and a spring for maintaining said counterweight arm in its proper position.

17. In an electrical measuring instrument, the combination with a movable element having a longitudinal hole in one end thereof, of a counterweight arm adapted to extend into said hole, and a spring having one end bearing against said member and the other end operatively bearing against said counterweight arm and adapted to maintain said counterweight arm in its proper position.

18. In an electrical measuring instrument, the combination with a movable shaft having a transverse hole therein of a counterbalancing arm extending through said hole, a member secured to said shaft substantially at right angles to and a short distance from said arm, said member having a longitudinal hole in one end, a counterweight arm adapted to freely move in the hole in said member and having a screw threaded portion, a nut threaded on said counterweight arm, and a flat spring having an aperture through which said shaft extends and positioned between said counterbalancing arm and said member with one end resting against said member and the other end resting against said nut and an intermediate portion acting against said counterbalancing arm whereby the nut is maintained in a relatively fixed position and the counterbalancing arm is firmly held in the hole in said shaft.

In witness whereof, I have hereunto set my hand this 24th day of September 1914.

WILLARD E. PORTER.

Witnesses:
BENJAMIN B. HULL,
MERTON W. SAGE.